United States Patent
Zhang

(10) Patent No.: US 11,381,403 B2
(45) Date of Patent: Jul. 5, 2022

(54) INTEGRATING BLOCKCHAIN WITH OFF-CHAIN SERVICES

(71) Applicant: SAP SE, Walldorf (DE)

(72) Inventor: Huijie Zhang, Ontario (CA)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 16/707,666

(22) Filed: Dec. 9, 2019

(65) Prior Publication Data

US 2021/0176077 A1    Jun. 10, 2021

(51) Int. Cl.
*H04L 29/06* (2006.01)
*H04L 9/32* (2006.01)

(52) U.S. Cl.
CPC ........ *H04L 9/3268* (2013.01); *H04L 2209/38* (2013.01)

(58) Field of Classification Search
CPC . H04L 9/3268; H04L 2209/38; H04L 9/3297; H04L 9/3247; H04L 9/3239
See application file for complete search history.

(56) References Cited

U.S. PATENT DOCUMENTS

| | | | |
|---|---|---|---|
| 9,635,000 B1* | 4/2017 | Muftic | H04L 9/3239 |
| 10,506,104 B1* | 12/2019 | Shakeri | H04L 9/3247 |
| 10,824,759 B1* | 11/2020 | Magerkurth | H04L 9/0894 |
| 2012/0210123 A1* | 8/2012 | Castelnuovo | H04L 63/0823 713/156 |
| 2014/0282869 A1* | 9/2014 | Dabbiere | G06F 21/30 726/3 |
| 2019/0205773 A1* | 7/2019 | Ackerman | G06Q 10/067 |
| 2020/0059354 A1* | 2/2020 | Yang | H04L 9/0637 |
| 2020/0084046 A1* | 3/2020 | Bessonov | H04L 9/3239 |
| 2020/0162261 A1* | 5/2020 | Iyer | G06Q 20/02 |
| 2020/0266996 A1* | 8/2020 | Carrott | H04L 63/0428 |
| 2020/0374129 A1* | 11/2020 | Dilles | G06F 21/45 |
| 2020/0403809 A1* | 12/2020 | Chan | H04L 9/3236 |
| 2021/0105148 A1* | 4/2021 | Greven | G06F 16/9024 |
| 2021/0119807 A1* | 4/2021 | Chen | H04L 9/3297 |
| 2021/0152327 A1* | 5/2021 | Givental | G09C 5/00 |
| 2021/0314170 A1* | 10/2021 | Wang | H04L 63/0428 |

* cited by examiner

*Primary Examiner* — Jeremy S Duffield
*Assistant Examiner* — Hassan A Hussein
(74) *Attorney, Agent, or Firm* — Mintz Levin Cohn Ferris Glovsky and Popeo, P.C.

(57) ABSTRACT

A method, a system, and a computer program product for validating a transaction. A received request to validate a transaction in accordance with one or more validation rules in a plurality of validation rules is executed. Based on the executed validation request, a validation certificate associated with the transaction is generated. Validity of the validation certificate is determined. The transaction is stored on a blockchain network upon determining that the validation certificate is valid. Storage of the transaction on the blockchain network is prevented upon determination that the validation certificate is invalid.

20 Claims, 7 Drawing Sheets

INTEGRATING BLOCKCHAIN WITH OFF-CHAIN SERVICES

TECHNICAL FIELD

This disclosure relates generally to data processing and, in particular, to an executable rule engine with blockchain smart contract validation service.

BACKGROUND

A blockchain is typically a decentralized, distributed digital ledger for recording transactions across different computing nodes that prevents retroactive alteration of records. Blockchain allows its members to independently verify and audit transactions. Blockchains may prevent members (e.g., companies) from posting invalid transaction data onto blockchain through use of smart contracts/smart filters, which require a transaction to be validated by a series of business rules prior to being posted to blockchain. However, the number of business rules is typically very large, where some of the rules may be developed outside of blockchain. Importing of these business rules into smart contract/smart filter may require a significant expenditure of computing resources and, in some cases may be impossible due to sensitive nature of the data that the rules may refer to. Further, invoking of business rules from a blockchain contract/smart filter might not be feasible either because a blockchain typically might not allow this to happen.

SUMMARY

In some implementations, the current subject matter relates to a computer implemented method for checking a validity of a transaction using a blockchain network. The method may include executing a received request to validate a transaction in accordance with one or more validation rules in a plurality of validation rules, generating, based on the executed validation request, a validation certificate associated with the transaction, determining a validity of the validation certificate, and storing the transaction on a blockchain network upon determining that the validation certificate is valid, and preventing storage of the transaction in the blockchain network upon determination that the validation certificate is invalid.

In some implementations, the current subject matter can include one or more of the following optional features. The method may also include transmitting (e.g., by a rule engine) the validation certificate to the blockchain network upon determining that the validation certificate is valid. The transaction may be stored or posted in the blockchain component upon verification of the validation certificate by the blockchain component.

In some implementations, the method may include generating an error message upon determination of at least one of the following: that the validation certificate is invalid, that the transaction transmitted to the blockchain network does not include the validation certificate, and any combination thereof. The validation certificate may include at least one of the following: a certificate identifier, an identifier of a requestor requesting the certificate, a certificate timestamp, an identifier of an issuer of the certificate, a sequence number of the certificate, and any combination thereof. In some implementations, the blockchain network may ensure that only the trusted rule engine and/or data source can post validation certificates to the blockchain network.

In some implementations, generating of the certificate may include generating a new validation certificate in accordance with the validation rules. The method may also include transmitting the generated new validation certificate to the blockchain component and storing the transaction in the blockchain component using the generated new validation certificate. Alternatively, the generated validation certificate may be a previously generated validation certificate. In some implementations, any off-blockchain network (or external to the blockchain network) data may be transmitted to the blockchain network as a trusted data by all participants of the blockchain network using the validation certificate, whereby the use of the validation certificate may serve as verification.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide an executable rule engine with blockchain smart contract validation service.

In some implementations, the current subject matter relates to a computing platform and/or an engine that may be configured to receive requests for validation of one or more transactions and execute such validation. In particular, the computing platform may be configured to implement use of blockchain techniques for executing validations of transactions, data, etc. In some implementations, blockchain techniques may include the use of a distributed database that may maintain a continuous/growing list of records (e.g., "blocks"), which may be secured from tampering/revision, and/or contain timestamps and/or links to a previous block. In some implementations, the current subject matter may be configured to execute the functionalities described herein in scenarios where smart contracts/smart filters may need to access various services and/or data that may be stored (or otherwise residing) in a blockchain network.

Figure 1:
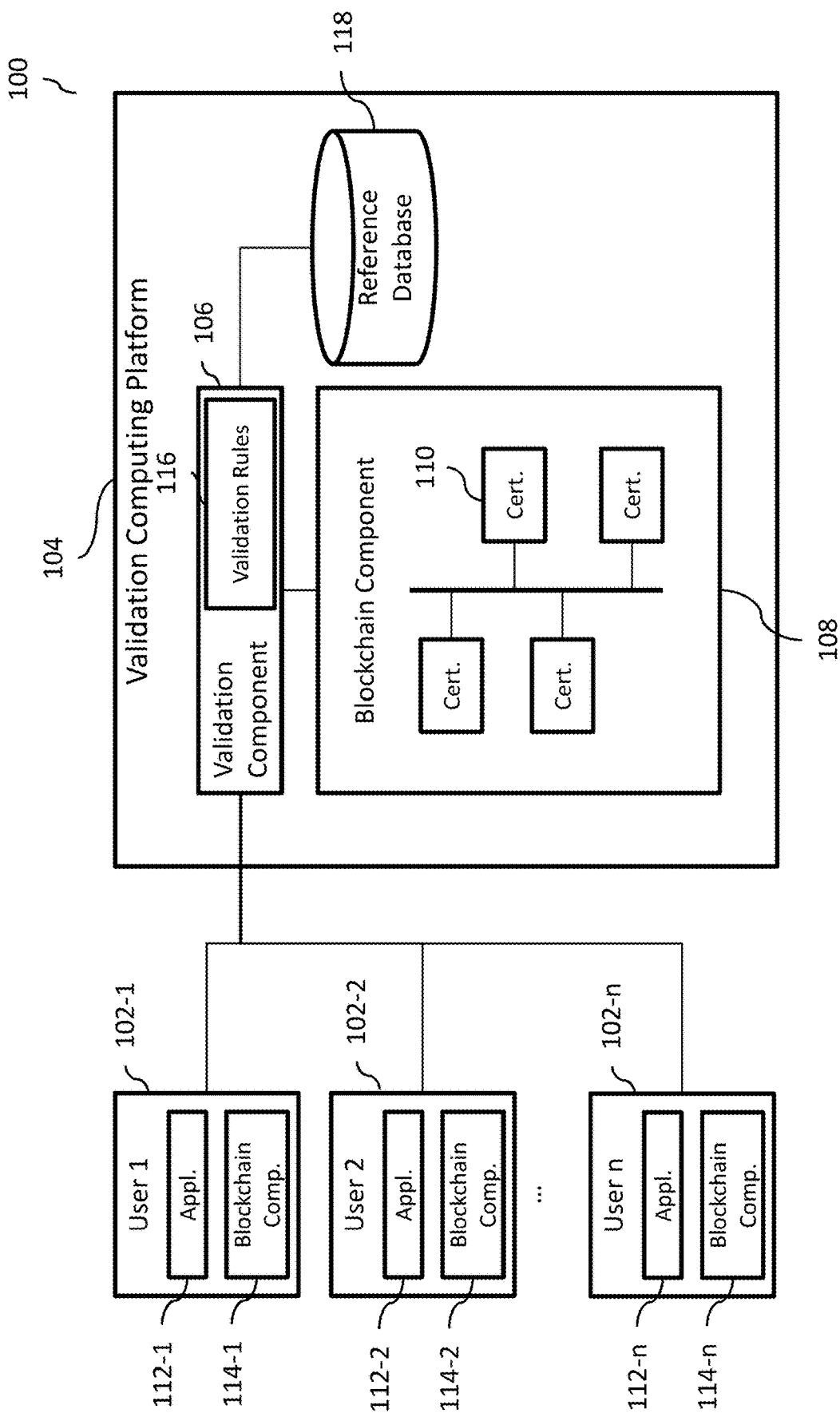
FIG. 1 illustrates an exemplary computing system for executing validation of transactions, according to some implementations of the current subject matter.

FIG. 1 illustrates an exemplary computing system 100 for executing validation of transactions, according to some implementations of the current subject matter. The system 100 may include one or more users (user 1, user 2, . . . user n) 102 communicatively coupled to a validation computing platform or a computing engine 104. The computing platform 104 may be a cloud computing platform and/or any other type of platform. The computing platform 104 may include a validation component 106 communicatively coupled to a blockchain component 108. The users 102 may include one or more application services 112 and/or blockchain computing components 114. The application services 112 may be configured to execute various transactions that may require validations with the computing platform 104. Examples of such transactions may include, among others, data access requests, application access requests, validation requests, financial transactions, sales transactions, data management transactions, sales orders, product delivery requests, etc., and/or any other transactions and/or any combinations of transactions.

The users 102, along with application services 112 and blockchain components 114, and the computing platform 104, along with the components 108 and 110, may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Further, the computing platform 104 may be coupled to one or more databases, storage locations, memory locations, and/or any combination of hardware and/or software components.

The computing platform 104 may include any combination of software and/or hardware components and may be configured to receive and execute a query from one or more users 102 for the purposes of performing validation of a particular transaction/application service and/or determining whether a certificate of a particular transaction/application service is valid.

In some implementations, the validation component or service 106 of the computing platform 104 may be configured to receive one or more queries and/or requests from one or client applications 112. The requests, as stated above, may relate to various transactions, such as, validation of transactions (e.g., orders, deliveries, etc.). The requests may be transmitted via an application programming interface (API) (not shown in FIG. 1). Once the request is received by the validation component 106, the validation component 106 may be configured to perform validation of the received request and/or transaction using one or more validation rules 116. The validation rules 116 may be stored by the computing platform 104.

The validation component 106 may be configured to determine whether the received request/transaction possesses a valid and/or trusted certificate (e.g., request/transaction may be received from a known and/or trusted source (e.g., user 102)). If so, the request/transaction may be validated. If a transaction is validated successfully (i.e., determined to be valid), the application 112 may be configured to request the validation component 106 to post a corresponding certificate 110 to the blockchain component 108, such that, at a later time, when the same application 112 may determine to request posting of the transaction to the blockchain component 108, that transaction may be verified against the certificate by the blockchain component 108, thereby speeding up processing of the transaction. This validation mechanism may also reduce a number of invalid transactions in computing systems and may avoid back-and-forth cycles during transaction processing.

Figure 2:
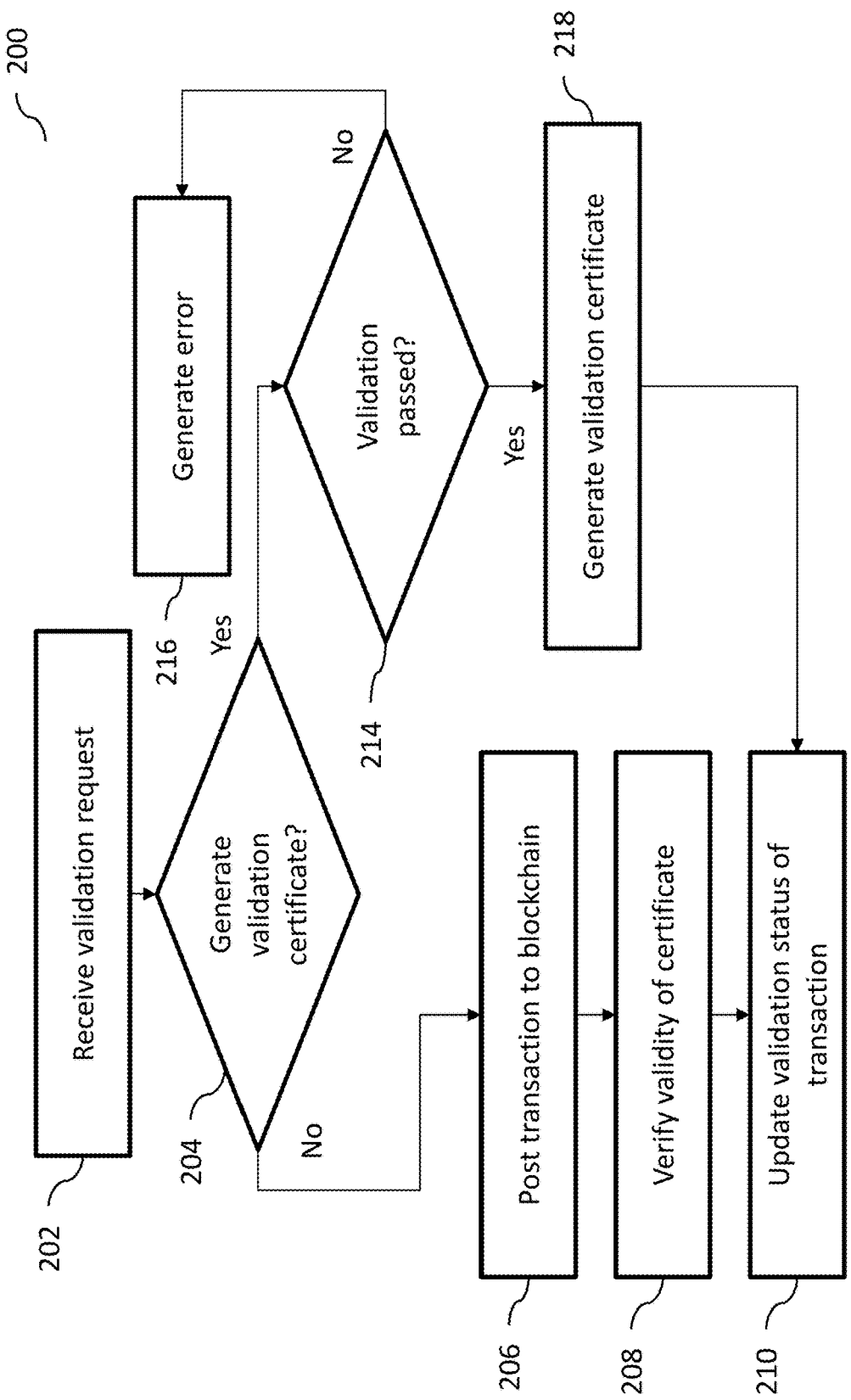
FIG. 2 illustrates an exemplary process for performing validation of a transaction using the system shown in FIG. 1, according to some implementations of the current subject matter.

FIG. 2 illustrates an exemplary process 220 for performing validation of a transaction using the system 100, according to some implementations of the current subject matter. The process 200 may be used by various users 102 to perform validation of various transactions (whether transactions are new transactions executed by new application services, or transaction executed by existing application services that may already have validated certificates). At 202, a transaction validation request may be received. The transaction validation request may be generated by an application 112 of the user 102. For example, the transaction may be a sales order transaction generated by the user 102. The transaction validation request may be received by an application programming interface or any other interface of the computing platform 104 (not shown in FIG. 1).

The validation request may include requisite information that may be necessary for the validation component to authenticate the client application 112 and/or post the transaction for which validation is being sought. The received request may be in the following exemplary format (e.g., for a sales order transaction):

```
{"TxnType":"PO","TransactionData":{"OrderNumber":"<company generated order number","FromCompany":"<CompanyCode>","ToCompany":"<CompanyCode>","ExpectedReceiveDate","<YYYY-MM-DD>","DeliveryAddress":"123 Main Street, Atlanta, GA, 55334","Items":[{"ProductCode":"SKU001","Quantity":100},{"ProductCode":"SKU002", "Quantity":100}]}}
```

At 204, the validation component 106 of the computing platform 104 may be configured to determine whether a new validation certificate may need to be generated for the received transaction. If not, then the received request is seeking validation of the transaction only (e.g., "validate only" request). The transaction may then be determined for posting to blockchain component 108, at 206.

The "validate only" request may have an input format show above. In response to the request, the validation component 106 may be configured to generate a response (during verification, at 208) that may be dependent on whether the request is capable of being validated. For example, the validation component 106 may be configured to issue an error message and explain reasons for the error (e.g., certificate is invalid, certificate does not exist, request is invalid, etc.). An exemplary format of the error message maybe as follows:
{"Status": "ERROR","Reasons":[{"Code:"101","Message1"}, {"Code:"102","Message2"}]}

Alternatively, or in addition to, a response to the request may be a warning. A warning may also be issued for a variety of reasons (e.g., the certificate is valid, but may be due to expire, certificate is invalid, transaction contains an error, etc.). An exemplary format of the warning message may be as follows:
{"Status": "WARNING","Reasons":[{"Code:"101","Message1"}, {"Code:"102","Message2"}]}

When the validation component determines that the request associated with the transaction is valid, it may be configured to generate an indicator stating the validation procedures have been passed, such as by issuing the following message:
{"Status":"PASS","Reasons":[ ]}.

Once the validity of the requested transaction and/or its certificate has been verified, the validation component may submit the information associated with the transaction to the blockchain component 108, which may in turn, update validation status of the transaction, at 210.

If at 204, the validation component 106 determines that a new validation certificate for the transaction should be generated, the processing may then proceed to 214, where validation process may be performed to generate an appropriate certificate for the received transaction for posting it to the blockchain 108. Generation of a new transaction certificate may be based on the request (e.g., received in the format specified above). Similar to transactions with existing certificates, the validation component 106 may be configured to generate an error, a warning, and/or a valid certificate. If after analyzing the received request, the validation component determines that some required information is missing, invalid, incorrect, etc., it may be configured to generate an error message, at 216. In case of an error, no transaction certificate is generated. The error message may have the following exemplary format:
{"Status":"ERROR","Reasons":[{"Code:"101","Message1"}, {"Code:"102","Message2"}]}

Figure 3:
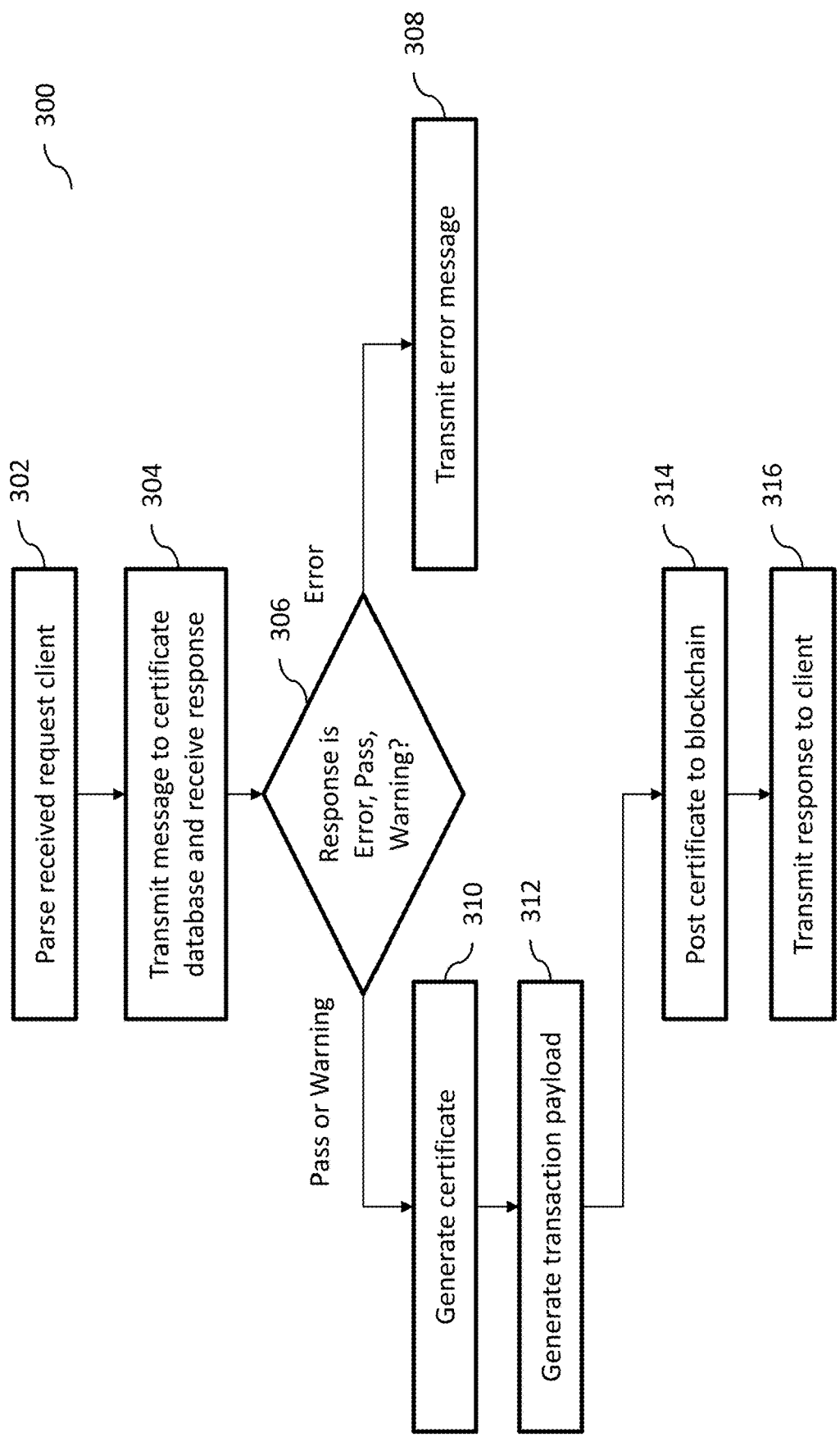
FIG. 3 illustrates an exemplary validation process, according to some implementations of the current subject matter.

Alternatively, the validation component 106 may be configured to generate a warning, such as, when some information is incorrect, but is not fatal to generation of the certificate. In case of the warning, the validation component 106 may still generate an appropriate validation certificate for the transaction, at 218. An exemplary format of the error message may be as follows:

FIG. 3 illustrates an exemplary validation process 300, according to some implementations of the current subject matter. At 302, a validation request may be received from a client application (e.g., application 112 of the user 102 as shown in FIG. 1). The request may also be parsed to determine the intent of the client, e.g., transaction validation, certificate validation, etc. The request may be received by the computing platform 104, such as, by the validation component 106. The validation component 106 may query a local reference database 118 (as shown in FIG. 1) that may be part of the computing platform 104 and/or be communicatively coupled to the platform 104. The database 118 may be configured to store information that may be required during execution of one or more validation rules 116, validated client applications, information that may be maintained by an owner entity/party of the validation rules (and/or any other rules), and/or any other information. The query generated by the validation component 106 may result in information concerning whether the request received from the client application 112 may correspond to a valid certificate or an error. If the response received from the database is an error, at 306, the validation component 106 may be configured to transmit an error message to the client application, at 308. The error message may be indicative that the transaction maybe invalid, and/or that a modification to the transaction may be required.

If the message received from the component 106 includes a "pass" (e.g., a valid request, valid transaction, etc.) or a "warning" (e.g., valid request but non-critical concerns may exist, etc.), at 306, then the validation component 106 may be requested to generate a validation certificate (at 310) and posted to the blockchain network. The validation component 106 may also generate a message to the client application 112 that having a message payload containing the generated validation certificate number, at 312.

At 314, the validation component 106 may be configured to post the validation certificate to the blockchain component 108, and transmit the generated message (at 312) to the client application 112, at 316. The client application 112, upon receipt of the generated message containing the certificate, may also verify the validity of the certificate, such as to ensure that the validation component 106 has generated the certificate. In some implementations, the client application 112 may be configured to compare information transmitted to it by the validation component 106 with the information that is stored in its own blockchain component 114. The client application 112, upon testing validity of the certificate, may generate a "valid" (if there is a match of the transmitted and stored information) or "invalid" (if there is no match) message. When the transaction, containing the certificate number, is posted to the blockchain network, the smart contract/smart filter may verify the validity of the transaction using the certificate.

In some implementations, the generated validation certificate may include one or more of the following information/data fields: a key (e.g., certificate number), an issuer (e.g., name of the certificate issuer), a timestamp (e.g., in a format of YYYY-MM-DD HH24:MI:SS.MIL), a signature (e.g., signature from the certificate creator, which may be generated by encryption of the issuer, certificate number and timestamp), TxnNumber (i.e., the transaction number), FromCompany field (e.g., client (requestor of the certificate)

{"Status":"WARNING","Reasons":[{"Code:"101","Message1"}, {"Code:"102","Message2"}],
"TransactionPayload":"dGhpcyBpcyB0aGUgb3JkZXIgaW5mb3JtYXRpb24="} company code), a HashCode (e.g., a hash code of the transaction). The following is an exemplary generated certificate:

```
{"CertificateNumber": "AAA", "Issuer":"ABC-Validation-Service", "Timestamp":"","
Signature":"AESEncryptedString", "TxnNumber":"Composed Order Number",
"FromCompany":"Company Code", "HashCode":""}
```

Figure 4:
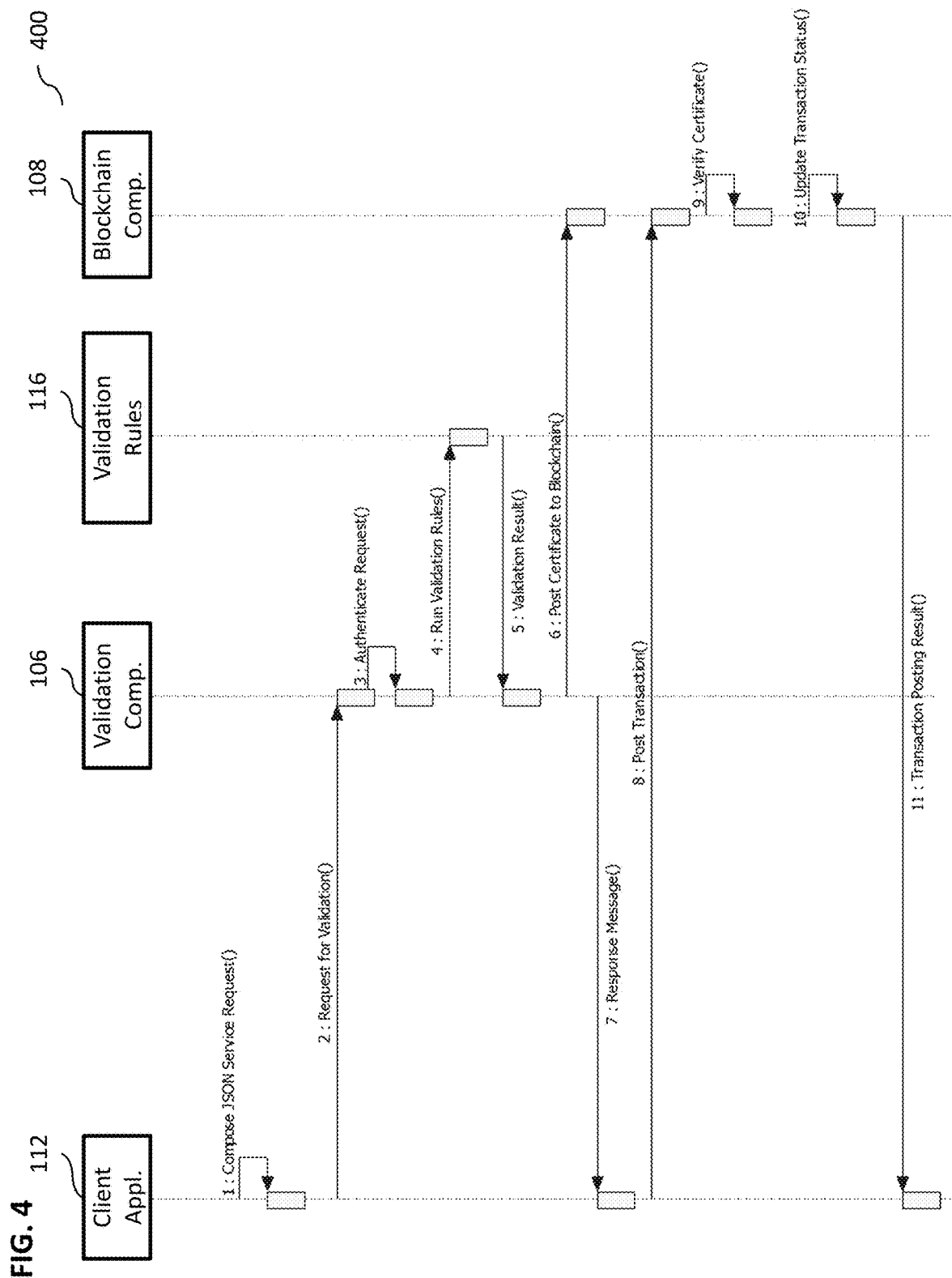
FIG. 4 illustrates an exemplary process for posting a transaction to a blockchain service, according to some implementations of the current subject matter

Once certificates have been issued, a client application may post transactions to blockchain service 108. FIG. 4 illustrates an exemplary process 400 for posting a transaction to a blockchain service 108, according to some implementations of the current subject matter. To post a transaction, the client application 112 may be configured to transmit an appropriate request (e.g., JSON service request) to the validation component 106. The payload of the request may include a ClientId and a password, e.g., {"ClientId":"Org1", "Password":"ABCDEFG","TxnInfo":{"TxnType":"PO/Delivery","The payload that contains the FULL transaction information"}}.

The validation component may be configured to execute one or more application programming interfaces (APIs). The APIs may be used to authenticate the received request as well as execute one or more validation rules 116 (e.g., which may be executed using a ValidateWithCert API executed by the validation component 106). The validation rules 116 may be used to validate the certificate in the received request, whereby a validation result that indicates whether or not the certificate is valid or not, as discussed above, may be generated. Then, the validation component 106 may be configured to post the certificate associated with the transaction contained in the request to the blockchain component 108. At the same time, the validation service 106 may transmit a response message to the client application 112, which may indicate that the transaction may be posted to the blockchain service (or return an error if it cannot). When posting the transaction to the blockchain component 108, the client application 112 may be configured to use the TxnInfo contained in the certificate (as described above) as a payload in its transaction posting message/request to the blockchain component 108. For example, the following information may be contained in the transaction posting message/request:

In some implementations, the transaction certificates and transactions may be transmitted between client applications 112, validation component 106 and blockchain component 108 using one or more communication channels, which may include at least one of a transaction channel and a reference data channel. In some implementations, three different APIs (e.g., "smart contracts") may be used for the purposes of: transaction certificates (e.g., generation of certificates, retrieving existing certificates, and verification of certificates), transaction service (e.g., CRUD (create, read, update, delete) of transactions), and reference data (e.g., management of reference data, e.g., companies lists (which company is allowed to purchase from which company)).

The transaction certificate API may be used for generation of certificates that may be used to post a newly generated certificate to the block chain component 108. It may also be used to retrieve a particular certificate from the reference database (e.g., database 118). A certificate identifier or number may be used for the purposes of retrieval. Additionally, this API may be used by the blockchain component 108 to verify validity of a particular certificate. Certificate identifier or number may be used to determine whether the certificate exists in the blockchain component 108, is coming from the authenticated issuer, and/or matches content of a particular transaction with which the certificate is associated. The above APIs may be invoked during the process shown in FIG. 4.

The transaction service API may be used to create a particular transaction. In some transactions, a validation and/or generation of a certificate may need to be performed. The API may also be used to update information in a particular posted transaction (e.g., update sales information, order information, etc.). Moreover, the API may be used to delete a particular posted transaction.

Further, as stated above, to manage various data (e.g., reference data—companies lists, etc.) associated with the

```
{"Validation
Result":{"Valid":"Error","Reasons":[ ],"TxnInfo":{"CertNumber":"CERT010101012",
"TxnType":"PO/Delivery","All fields that are needed for a Transaction"}}.
```

In alternate exemplary implementations, the TxnInfo may include a Base64-encoded string that represents the same information, such as:

user 102, reference data API may be used to create, read, update, delete (CRUD) various data associated with the user 102. The data may include one or more of the following:

```
{"Validation
Result":{"Valid":"Error","Reasons":[ ],"TxnInfo":"eyJDZXJ0TnVtYmVyIjoiQ0VSVDAxMDEwM
TAxMiIsIOKAnFR4blR5cGUiOiJQTy9EZWxpdmVyeSIsIkFsbCBmaWVsZHMgdGhhdCBhcmUg
bmVlZGVkIGZvciBhIFRyYW5zYWN0aW9uIn0="}.
```

Once transaction is posted to the blockchain component 108, the blockchain component 108 may be configured to verify the certificate and update transaction status (e.g., posted, trusted, etc.). The blockchain component 108 may user code (e.g., organization name), user communication permissions (e.g., one user can purchase from another user), agent certificates, active status, whether transaction may be accepted if validation fails, etc.

Figure 5:
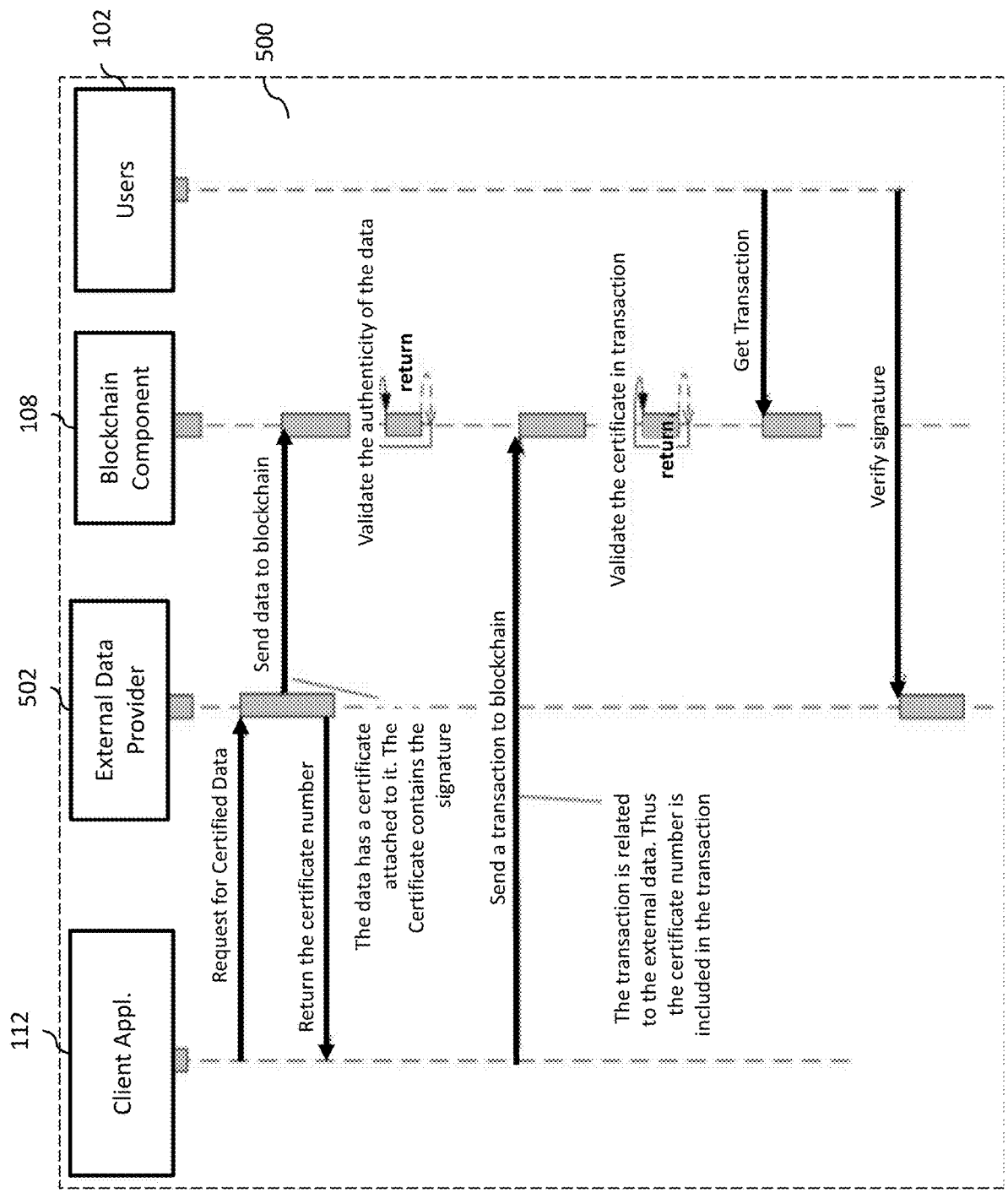
FIG. 5 illustrates an exemplary process for verification of external data, according to some implementations of the current subject matter.

In some implementations, the current subject matter may be configured to perform external certificate verification. This verification may be used when a user 102 wishes to post external data to blockchain component 108. To perform verification, certificate signature, which may include one or more of the following data fields: a certificate identifier, request by field, certificate issued by field, certificate timestamp, and a sequence number field, may be verified. The information may be verified with one or more external data providers. FIG. 5 illustrates an exemplary process 500 for verification of external data, according to some implementations of the current subject matter. The process 500 may be initiated by the client application 112 requesting a certified data from an external data provider 502. The external data provider 502 may transmit a certificate (e.g., certificate number, certificate signature, etc.) associated with the data and/or the provider to the client application and to the blockchain component 108. The blockchain component 108 may be configured to verify and/or validate authenticity of the data, including the received certificate.

The client application 112 may then transmit a transaction for posting to the blockchain component 108. The transaction may be related to the external data and may include the certificate information received from the external data provider 502. The blockchain component 108 may be configured to validate the certificate in the received transaction against the previously received data. Once the certificate has been validated and transaction has been posted to the blockchain, other users 102 may be configured to retrieve transactions and verify signatures associated with the transaction with the external data provider 502.

Figure 6:
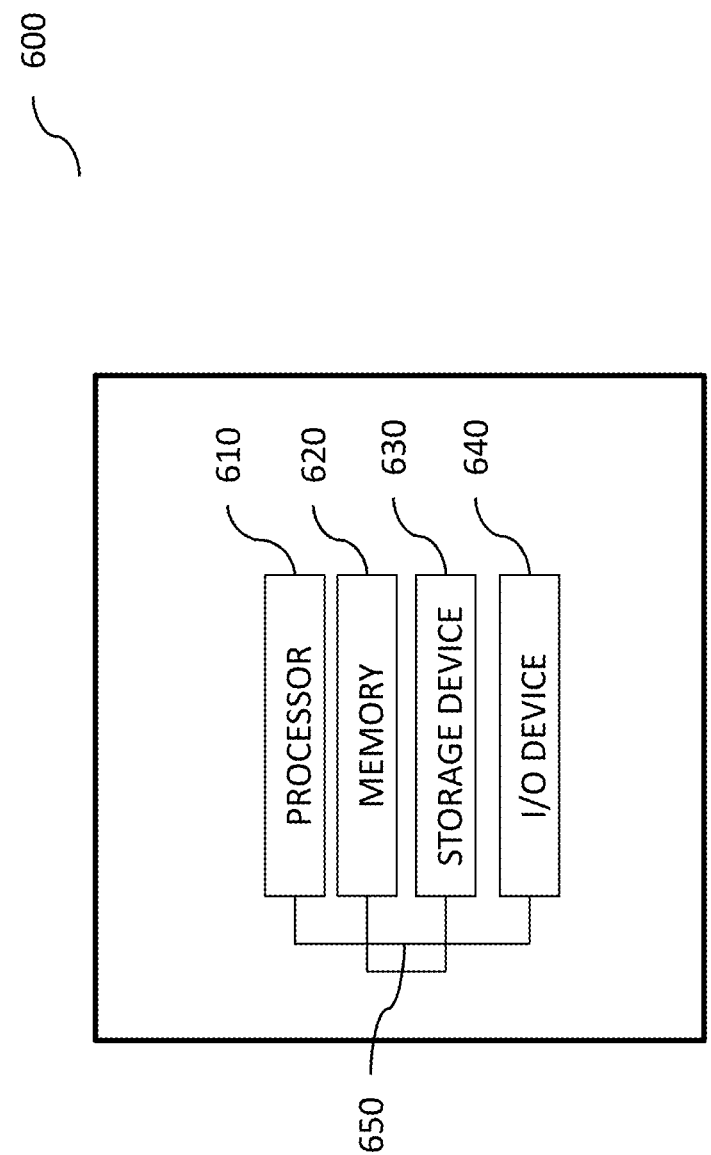
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
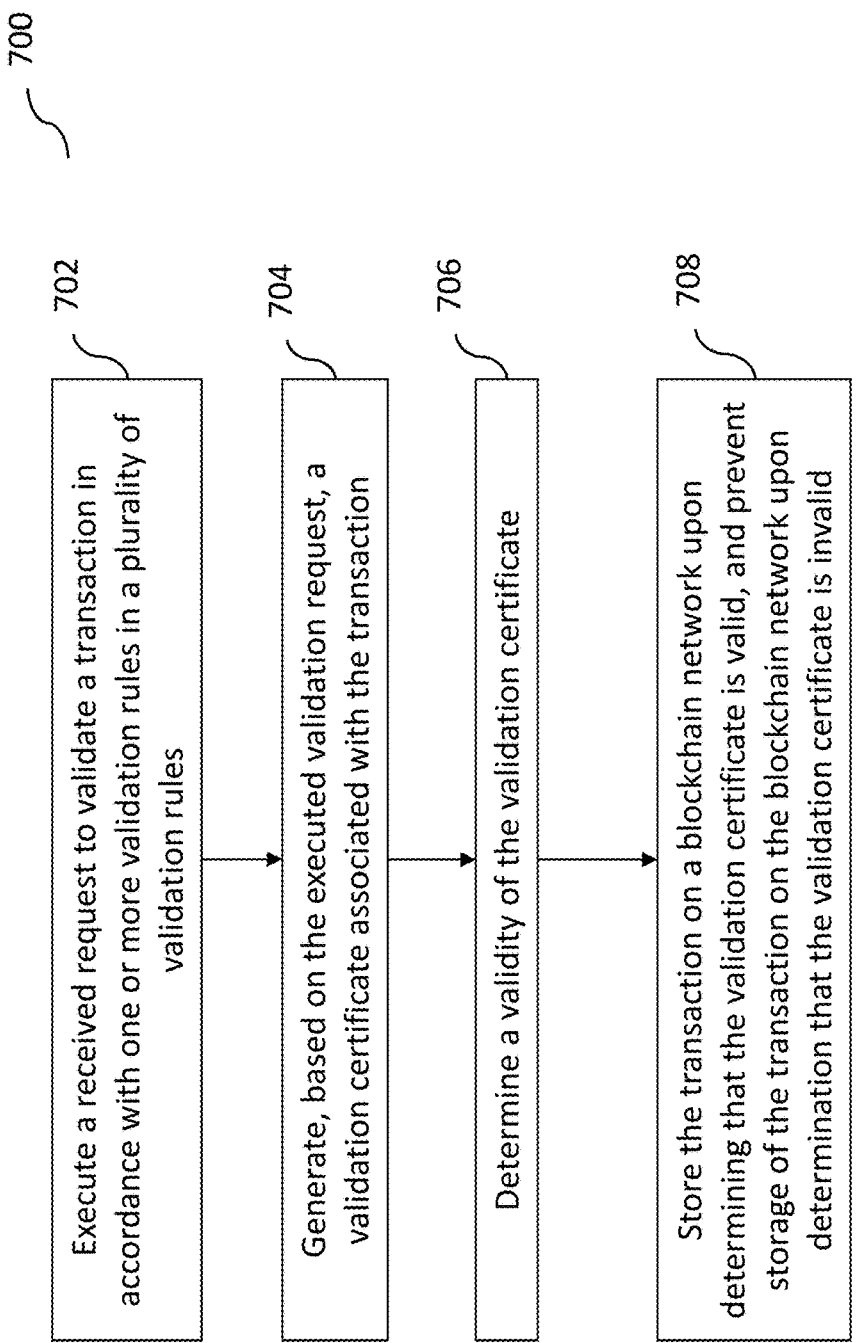
FIG. 7 is an exemplary method, according to some implementations of the current subject matter.

FIG. 7 illustrates an exemplary method 700 for executing a validation of a transaction, according to some implementations of the current subject matter. At 702, a received request to validate a transaction may be executed in accordance with one or more validation rules in a plurality of validation rules. For example, validation network 104 shown in FIG. 1 may be configured to receive and execute such request. The transaction may be a sales order transaction that may need to be verified to ensure validity of the transaction, sender, etc. At 704, based on the executed validation request, a validation certificate associated with the transaction may be generated and its validity may be determined by the validation network 104, at 706. At 708, the transaction may be posted or stored on a blockchain network (e.g., blockchain network 108 shown in FIG. 1) upon determination that the validation certificate is valid. Alternatively, storage or posting of the transaction on the blockchain network may be prevented upon determination that the validation certificate is invalid.

In some implementations, the current subject matter can include one or more of the following optional features. The method may also include transmitting the validation certificate to a blockchain network upon determining that the validation certificate is valid. The transaction may be stored or posted on the blockchain network upon verification of the validation certificate by the blockchain network.

In some implementations, the method may include generating an error message upon determination of at least one of the following: that the validation certificate is invalid, that the transaction transmitted to the blockchain network does not include the validation certificate, and any combination thereof. The validation certificate may include at least one of the following: a certificate identifier, an identifier of a requestor requesting the certificate, a certificate timestamp, an identifier of an issuer of the certificate, a sequence number of the certificate, and any combination thereof. In some implementations, the blockchain network may ensure that only the trusted rule engine and/or data source can post validation certificates to the blockchain network.

In some implementations, generating of the certificate may include generating a new validation certificate in accordance with the validation rules. The method may also include transmitting the generated new validation certificate to the blockchain network and storing the transaction on the blockchain network using the generated new validation certificate. Alternatively, the generated validation certificate may be a previously generated validation certificate. In some implementations, any off-blockchain network (or external to the blockchain network) data may be transmitted to the blockchain network as a trusted data by all participants of the blockchain network using the validation certificate, whereby the use of the validation certificate may serve as verification.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:

executing a received request to validate a transaction in accordance with one or more validation rules in a plurality of validation rules;

generating, based on the executed validation request, a validation certificate associated with the transaction, the validation certificate being generated using one or more validation rules in the plurality of validation rules and including a certificate number, a name of the validation certificate issuer, a timestamp, a signature including encrypted certificate number, name of the validation certificate issuer, and the timestamp, a transaction number, and a hashcode of the transaction, the generating of the validation certificate including generating the validation certificate based on a determination that at least some information associated with the transaction is incorrect, validating the transaction having the at least some incorrect information, and generating at least one application programming interface for modifying the validated transaction;

determining a validity of the validation certificate, the determining including determining validity of the received request using one or more validation rules in the plurality of validation rules; and storing the transaction on a blockchain network upon determining that the validation certificate and the received request are valid, and preventing storage of the transaction on the blockchain network upon determination that at least one of the validation certificate and the received request is invalid, wherein the determining of the validity of the validation certificate and the received request includes accessing at least another blockchain network to check information included in the validation certificate and the received request against information stored in the at least another blockchain network, wherein at least one of the storing and the preventing is performed in response to receiving a request to post the transaction to the blockchain network, the request including a type of the transaction, a transaction information, and a payload containing full transaction information, the full transaction information being encoded in the validation certificate, the preventing including requesting a modification of the transaction to generate, using the at least one application programming interface, a modified transaction for executing a validation of the modified transaction.

2. The method according to claim 1, further comprising transmitting the validation certificate to the blockchain network upon determining that the validation certificate is valid, wherein the transaction is stored on the blockchain network upon verification of the validation certificate by the blockchain network.

3. The method according to claim 1, further comprising generating an error message upon determination of at least one of the following: that the validation certificate is invalid, that the transaction transmitted to the blockchain network does not include the validation certificate, and any combination thereof.

4. The method according to claim 1, wherein the validation certificate includes at least one of the following: a certificate identifier, an identifier of a requestor requesting the certificate, a certificate timestamp, an identifier of an issuer of the certificate, a sequence number of the certificate, and any combination thereof.

5. The method according to claim 1, wherein the generating includes generating a new validation certificate in accordance with the one or more validation rules in the plurality of validation rules.

6. The method according to claim 5, further comprising transmitting the generated new validation certificate to the blockchain network; and storing the transaction on the blockchain network using the generated new validation certificate.

7. The method according to claim 1, wherein the generated validation certificate is a previously generated validation certificate.

8. A system comprising:

at least one programmable processor; and a non-transitory machine-readable medium storing instructions that, when executed by the at least one programmable processor, cause the at least one programmable processor to perform operations comprising:

executing a received request to validate a transaction in accordance with one or more validation rules in a plurality of validation rules;

generating, based on the executed validation request, a validation certificate associated with the transaction, the validation certificate being generated using one or more validation rules in the plurality of validation rules and including a certificate number, a name of the validation certificate issuer, a timestamp, a signature including encrypted certificate number, name of the validation certificate issuer, and the timestamp, a transaction number, and a hashcode of the transaction, the generating of the validation certificate including generating the validation certificate based on a determination that at least some information associated with the transaction is incorrect, validating the transaction having the at least some incorrect information, and generating at least one application programming interface for modifying the validated transaction;

determining a validity of the validation certificate, the determining including determining validity of the received request using one or more validation rules in the plurality of validation rules; and storing the transaction on a blockchain network upon determining that the validation certificate and the received request are valid, and preventing storage of the transaction on the blockchain network upon determination that at least one of the validation certificate and the received request is invalid, wherein the determining of the validity of the validation certificate and the received request includes accessing at least another blockchain network to check information included in the validation certificate and the received request against information stored in the at least another blockchain network, wherein at least one of the storing and the preventing is performed in response to receiving a request to post the transaction to the blockchain network, the request including a type of the transaction, a transaction information, and a payload containing full transaction information, the full transaction information being encoded in the validation certificate, the preventing including requesting a modification of the transaction to generate, using the at least one application programming interface, a modified transaction for executing a validation of the modified transaction.

9. The system according to claim 8, wherein the operations further comprise transmitting the validation certificate to the blockchain network upon determining that the validation certificate is valid, wherein the transaction is stored on the blockchain network upon verification of the validation certificate by the blockchain network.

10. The system according to claim 8, wherein the operations further comprise generating an error message upon determination of at least one of the following: that the validation certificate is invalid, that the transaction transmitted to the blockchain network does not include the validation certificate, and any combination thereof.

11. The system according to claim 8, wherein the validation certificate includes at least one of the following: a certificate identifier, an identifier of a requestor requesting the certificate, a certificate timestamp, an identifier of an issuer of the certificate, a sequence number of the certificate, and any combination thereof.

12. The system according to claim 8, wherein the generating includes generating a new validation certificate in accordance with the one or more validation rules in the plurality of validation rules.

13. The system according to claim 12, wherein the operations further comprise transmitting the generated new validation certificate to the blockchain network; and storing the transaction on the blockchain network using the generated new validation certificate.

14. The system according to claim 8, wherein the generated validation certificate is a previously generated validation certificate.

15. A computer program product comprising a non-transitory machine-readable medium storing instructions that, when executed by at least one programmable processor, cause the at least one programmable processor to perform operations comprising:

executing a received request to validate a transaction in accordance with one or more validation rules in a plurality of validation rules;

generating, based on the executed validation request, a validation certificate associated with the transaction, the validation certificate being generated using one or more validation rules in the plurality of validation rules and including a certificate number, a name of the validation certificate issuer, a timestamp, a signature including encrypted certificate number, name of the validation certificate issuer, and the timestamp, a transaction number, and a hashcode of the transaction, the generating of the validation certificate including generating the validation certificate based on a determination that at least some information associated with the transaction is incorrect, validating the transaction having the at least some incorrect information, and generating at least one application programming interface for modifying the validated transaction;

determining a validity of the validation certificate, the determining including determining validity of the received request using one or more validation rules in the plurality of validation rules; and storing the transaction on a blockchain network upon determining that the validation certificate and the received request are valid, and preventing storage of the transaction on the blockchain network upon determination that at least one of the validation certificate and the received request is invalid, wherein the determining of the validity of the validation certificate and the received request includes accessing at least another blockchain network to check information included in the validation certificate and the received request against information stored in the at least another blockchain network, wherein at least one of the storing and the preventing is performed in response to receiving a request to post the transaction to the blockchain network, the request including a type of the transaction, a transaction information, and a payload containing full transaction information, the full transaction information being encoded in the validation certificate, the preventing including requesting a modification of the transaction to generate, using the at least one application programming interface, a modified transaction for executing a validation of the modified transaction.

16. The computer program product according to claim 15, wherein the operations further comprise transmitting the validation certificate to the blockchain network upon determining that the validation certificate is valid, wherein the transaction is stored on the blockchain network upon verification of the validation certificate by the blockchain network.

17. The computer program product according to claim 15, wherein the operations further comprise generating an error message upon determination of at least one of the following: that the validation certificate is invalid, that the transaction transmitted to the blockchain network does not include the validation certificate, and any combination thereof.

18. The computer program product according to claim 15, wherein the validation certificate includes at least one of the following: a certificate identifier, an identifier of a requestor requesting the certificate, a certificate timestamp, an identifier of an issuer of the certificate, a sequence number of the certificate, and any combination thereof.

19. The computer program product according to claim 15, wherein the generating includes generating a new validation certificate in accordance with the one or more validation rules in the plurality of validation rules;

wherein the operations further comprise transmitting the generated new validation certificate to the blockchain network; and storing the transaction on the blockchain network using the generated new validation certificate.

20. The computer program product according to claim 15, wherein the generated validation certificate is a previously generated validation certificate.

* * * * *